US007956523B2

(12) United States Patent
Kuroda et al.

(10) Patent No.: US 7,956,523 B2
(45) Date of Patent: Jun. 7, 2011

(54) IMAGE DISPLAY APPARATUS HAVING SPACER WITH CARBON FILM

(75) Inventors: Kazuo Kuroda, Kamakura (JP); Nobuhiro Ito, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 12/113,303

(22) Filed: May 1, 2008

(65) Prior Publication Data

US 2008/0290780 A1 Nov. 27, 2008

(30) Foreign Application Priority Data

May 25, 2007 (JP) ................................ 2007-139372
Apr. 24, 2008 (JP) ................................ 2008-113900

(51) Int. Cl.
*H01J 9/00* (2006.01)
*H01J 9/24* (2006.01)
*B32B 5/00* (2006.01)

(52) U.S. Cl. ........ 313/282; 313/495; 313/498; 313/309; 313/310; 428/307.7

(58) Field of Classification Search ........................ None
See application file for complete search history.

(56) References Cited

U.S. PATENT DOCUMENTS

| | | | | |
|---|---|---|---|---|
| H1922 | H * | 11/2000 | Fusco et al. | 524/496 |
| 2003/0080476 | A1 * | 5/2003 | Barton et al. | 264/603 |
| 2003/0141803 | A1 | 7/2003 | Fushimi | 313/495 |
| 2004/0161997 | A1 * | 8/2004 | Ito et al. | 445/24 |

FOREIGN PATENT DOCUMENTS

| | | |
|---|---|---|
| EP | 1 114 881 A1 | 7/2001 |
| JP | 2004-138508 | 5/2004 |
| JP | 2006-216423 | 8/2006 |

OTHER PUBLICATIONS

Tanaka et al. (Japanese patent translation 2006-216423,Aug. 2006, machine translation.*

European Communication and Search Report, dated Sep. 15, 2008, Regarding Application No. 08155871.0-2208.

Balasubramanian et al., "Surface-bulk Core-level Splitting in Graphite", The American Physical Society, Physical Review B, vol. 64, pp. 205420-1 to 205420-3 (Nov. 6, 2001).

* cited by examiner

*Primary Examiner* — Anne M Hines
*Assistant Examiner* — Tracie Green
(74) *Attorney, Agent, or Firm* — Fitzpatrick, Cella, Harper & Scinto

(57) ABSTRACT

A carbon film is coated over the surface of a spacer. The carbon film has the following three features when the binding state of carbon is analyzed by X-ray photoelectron spectroscopy: (a) an integral area of a region of 284.5 eV or below is 27% or less of an integral area attributed to carbon, (b) an integral area of a region of 286.0 eV-287.0 eV is 18% or less thereof, and (c) an integral area of a region of 287.0 eV or above is 9% or more thereof.

3 Claims, 8 Drawing Sheets

IMAGE DISPLAY APPARATUS HAVING SPACER WITH CARBON FILM

BACKGROUND OF THE INVENTION

1. Field of the Invention

The present invention relates to a flat image display apparatus including an electron-emitting device and a light-emitting member. More particularly, the present invention relates to an atmospheric pressure-resistant support structure (e.g., a spacer) to hold a distance between an electron source substrate on which an electron-emitting device is formed and a substrate on which a light-emitting member is formed.

2. Description of the Related Art

Hitherto, for image display apparatuses such as a cathode ray tube (CRT), a larger screen has been in demand but at a lesser thickness and weight than were provided previously. As an image display apparatus having a reduced thickness and weight, the inventors have previously proposed a flat image display apparatus using a surface-conduction electron-emitting device. In the image display apparatus using such an electron-emitting device, a rear plate (substrate) including the electron-emitting device and a face plate (substrate) including a light-emitting member that emits light in response to being irradiated with electrons, are arranged to face each other. A space between both the plates is sealed off at their peripheral edges by bonding a frame member to the peripheral edges, thereby forming a vacuum container. That type of image display apparatus includes an atmospheric pressure-resistant support structure, called a spacer, interposed between the substrates in order to prevent deformations and breakage of the substrates caused by a difference in air pressure between the interior and exterior of the vacuum container. The spacer is typically in the form of a rectangular thin plate and is arranged with its opposite ends contacting both the substrates such that space surfaces are extended parallel to the direction normal to the surface of each substrate.

The spacer is made of an insulator, e.g., a glass material, similarly to the rear plate and the face plate. However, if the surface of the spacer made of an insulator is charged, the trajectory of an electron beam emitted from the electron-emitting device is affected in some cases. One solution to cope with such a problem is to form, on the spacer surface, an electro-conductive coating that has a small secondary electron emission coefficient. Japanese Patent Laid-Open No. 2000-90859 (U.S. Pat. No. 6,265,822) proposes a spacer having a coating of carbon nitride.

However, the inventors have recognized the following problem with the related art. When an image display apparatus provided with the known spacer having the coating of carbon nitride is continuously operated, the trajectory of an electron beam is changed from an initial state, thus resulting in a change of the position of a light-emitting point.

SUMMARY OF THE INVENTION

The present invention provides an image display apparatus employing a novel spacer, which can overcome the above-mentioned problem.

According to the present invention, an image display apparatus includes a rear plate having electron-emitting devices thereon, a face plate having associated image-forming members configured to emit light upon being irradiated with electrons emitted from the electron-emitting devices, and at least one spacer positioned between the rear plate and the face plate. The spacer has a carbon film on a surface thereof and the carbon film has characteristics such that, in a spectrum obtained by X-ray photoelectron spectroscopy, an integral area of a region of 284.5 eV or below is 27% or less of an integral area attributed to carbon, an integral area of a region of 286.0 eV-287.0 eV is 18% or less thereof, and an integral area of a region of 287.0 eV or above is 9% or more thereof.

In the image display apparatus employing the novel spacer according to the present invention, even after the image display apparatus has been operated for a long time, the trajectory of an electron beam emitted from the electron-emitting device is not changed substantially and good display performance can be maintained. More specifically, insulation of coated carbon is ensured by limiting an sp2 ratio as a compound component in the carbon film coated on the spacer surface. Also, by specifying a lower limit of a content ratio of structures having oxygen-carbon bonds of C—O and C═O, graphitization is suppressed even when the spacer is exposed to irradiation of an electron beam during driving for a long time. As a result, even after the driving for a long time, the resistance of the spacer is substantially not changed and an effect upon the trajectory of the electron beam can be suppressed. Further, by additionally specifying an upper limit of an sp3 component, graphitization is similarly suppressed even when the spacer is exposed to the irradiation of the electron beam during driving for a long time. As a result, even after driving for a long time, the resistance of the spacer is substantially not changed and an effect upon the trajectory of the electron beam can be suppressed. When halogen elements, such as F, I, Cl and Br, are present near a terminal end of carbon, those halogen elements can detach and attack other members, thus causing an adverse effect in some cases. In order to avoid the adverse effect, an amount of the halogen elements is set preferably to 5% or less with respect to an amount of carbon present on the spacer surface.

Further features of the present invention will become apparent from the following description of exemplary embodiments with reference to the attached drawings.

DESCRIPTION OF THE EMBODIMENTS

Figure 1:
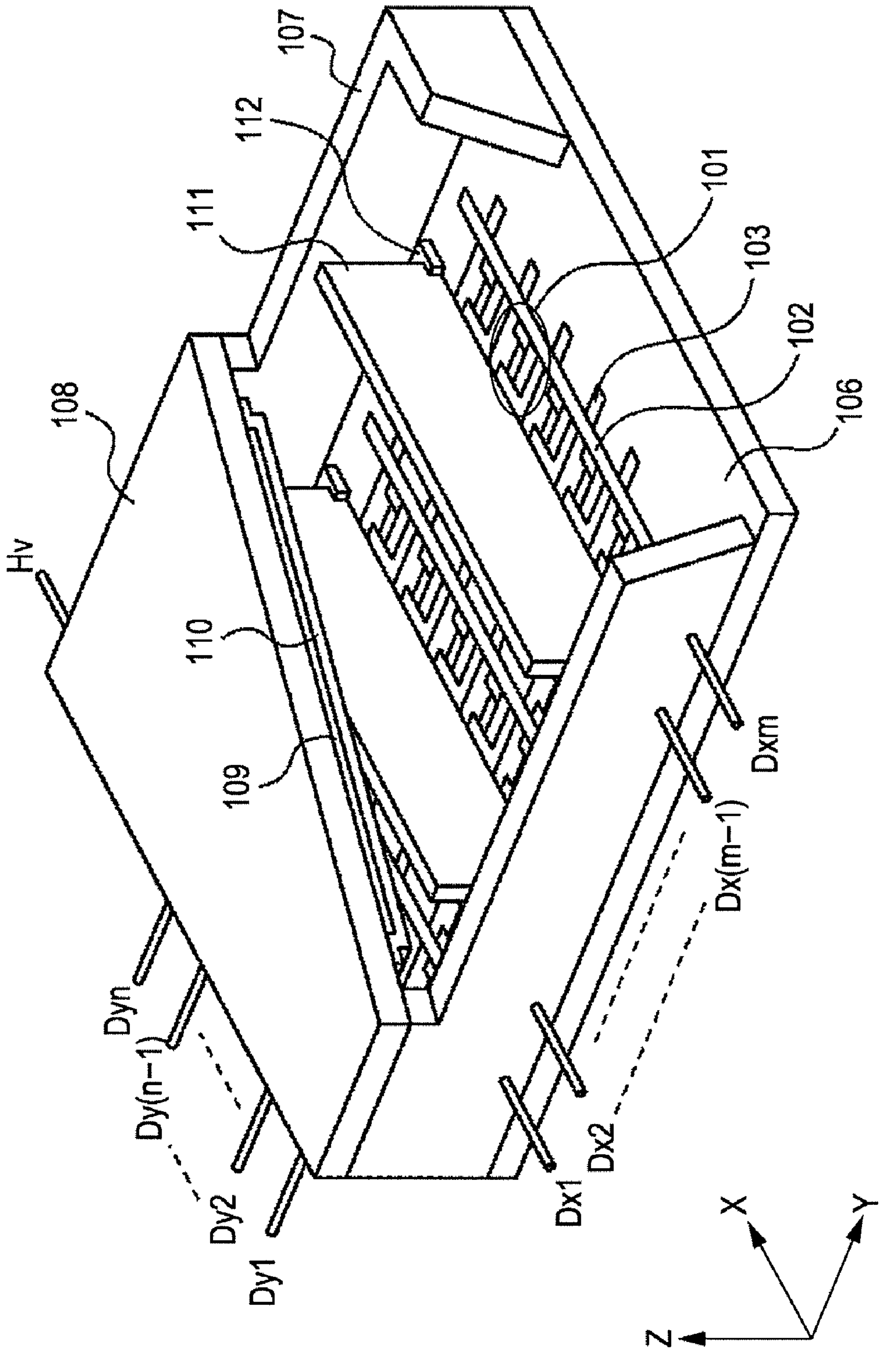
FIG. 1 is a schematic perspective view of a display panel representing one example of an image display apparatus according to the present invention.

FIG. 1 is a schematic perspective view of a display panel representing one example of an image display apparatus according to the present invention. In FIG. 1, the display panel is partly cut away to illustrate an internal structure. Referring to FIG. 1, the display panel includes a surface-conduction electron-emitting device 101, a row direction wiring 102, a column direction wiring 103, a rear plate (electron source substrate) 106, a frame member 107, a face plate (anode substrate) 108, a fluorescent (phosphor) film 109, and a metal back (anode electrode) 110. Further, the display panel includes a spacer 111 and a spacer fixing member 112.

In the present invention, the rear plate 106 serving as the electron source substrate and the face plate 108 serving as the anode substrate define a space that is sealed off by bonding a frame member 107 to their peripheral edges, thereby forming an airtight container. Because the interior of the airtight container is held in a vacuum state at a level of about $10^{-4}$ Pa, the spacer 111 in the form of a rectangular thin plate is disposed as an atmospheric pressure-resistance support structure to prevent damage caused by the atmospheric pressure, an accidental impact, etc. In addition, ends of the spacer 111 are fixed in place by the fixing members 112 at positions outside an image display region.

On the rear plate 106, the surface-conduction electron-emitting device 101 is formed in number (N×M) such that a simple matrix array is provided by a number M of row direction wirings 102 and a number N of column direction wirings 103 (M and N are each a positive integer). The row direction wirings 102 and the column direction wirings 103 are insulated from each other by interlayer insulating layers (not shown) in areas where they would otherwise intersect. Note that although the field emission type electron-emitting devices 101 are formed in the simple matrix array in the illustrated example, the present invention is not limited only to the illustrated example. The present invention can also be applied to other type of electron-emitting devices, such as those of the field emission (FE) type and the MIM (Metal-Insulator-Metal) type. In those cases, the array pattern is also not limited to the simple matrix array.

In the construction of FIG. 1, the fluorescent film 109 and the metal back 110, the latter serving as an anode electrode and being well known in the field of CRT, are formed on an underside of the face plate 108. The fluorescent film 109 is made of phosphors coated in three primary colors of red, green and blue. A black conductor (black stripe) (not shown in FIG. 1) is disposed between the adjacent phosphors in different colors. An array of the phosphors (image-forming members) can be designed, for example, in stripes, delta arrangement, or matrix pattern depending on the array of the electron source.

The spacer used in the present invention is arranged to extend substantially parallel to the row direction wirings 102 each serving as a cathode electrode, and is electrically connected to at least one of the row direction wirings 102 and the metal back 110 serving as the anode electrode.

Further, the spacer used in the present invention is held in contact with at least one anode electrode and the electron source, according to one embodiment of the invention. An electro-conductive film can be additionally formed on a contact surface of the spacer with each of the anode electrode and the electron source.

While the spacer 111 shown in FIG. 1 is in the form of a rectangular thin plate and can be satisfactorily used in the present invention, the spacer usable in the present invention is not limited to that form. Another suitable form, e.g., a columnar shape or another suitable shape, can also be optionally selected so long as a comparable effect is obtained.

The constructive feature and the working effect of the spacer 111 used in the present invention will be described below.

As discussed before, based on intensive studies, the inventors have confirmed a new phenomenon that when the image display apparatus provided with the known spacer (i.e., the spacer having the carbon nitride film coated on its surface) is continuously operated, the trajectory of the electron beam is changed over time in the vicinity of the spacer. It is also confirmed that a resistance distribution state on the spacer surface differs between a spacer in an initial driving stage and a spacer that has been subjected to driving for a long time. The mechanism causing such a difference will be described below though not yet fully clarified in details.

An experimental result is obtained by preparing a display including spacers disposed therein, and driving the display in its particular region. After confirming a change in the trajectory of an electron beam, the display is disassembled and the spacers are taken out from a driven region and a non-driven region. This means preparation of a spacer in an initial driving stage and a spacer having been subjected to driving for a long time. In other words, the spacer located in the non-driven region is a spacer in the initial driving stage, and the spacer located in the driven region is a spacer that has been subjected to driving for a long time. The surface composition of each spacer is then analyzed by an X-ray photoelectron spectroscopy (called XPS hereinafter). The analysis result indicates that a ratio of a graphite component is higher on the surface of the spacer removed from the driven region than on the surface of the spacer removed from the non-driven region. Further, it is confirmed that graphite is present in a larger amount, particularly on a portion of the spacer removed from the driven region, at a position nearer to the face plate. Such a result is attributable to the fact that sp3 bonds on the spacer surface are changed to sp2 bonds with irradiation of, e.g., electrons reflected from the face plate during the driving of the display. When the spacer surface partly causes graphitization, electric conductivity in such a portion is increased, thus generating a resistance distribution over the entire spacer surface. Consequently, a potential distribution state of the spacer surface becomes different from its initial state, whereby the trajectory of the electron beam becomes changed as a result.

The present invention has been achieved as a result of conducting intensive studies with an intent to prevent the above-described phenomenon. In other words, according to the present invention, the spacer has a carbon film on its surface and the carbon film has characteristics such that, in a spectrum obtained by X-ray photoelectron spectroscopy, an integral area of a region of 284.5 eV or below is 27% or less of an integral area attributed to carbon, an integral area of a region of 286.0 eV-287.0 eV is 18% or less of an integral area attributed to carbon, and an integral area of a region of 287.0 eV or above is 9% or more of an integral area attributed to carbon.

A method for analyzing the carbon film formed on the spacer surface according to the present invention will be described next.

Although there are many carbon analyzing methods, the XPS (X-ray photoelectron spectroscopy) is optimum for analyzing the carbon film formed on the spacer surface according to the present invention. The reasons are that about 10 nm depth information from the surface can be obtained, that a carbon state can be estimated based on a capability of separating a binding state, and that carbon in a trace amount (about 3 nm or less in terms of film thickness) can be measured without changing properties of the carbon.

In addition to the XPS, there are several methods for analyzing a carbon state, such as Raman spectroscopy, infrared spectroscopy, and GC-MS. However, with Raman spectroscopy and the infrared spectroscopy, it can be difficult to perform an accurate analysis unless a certain amount of carbon is present. The GC-MS is superior in trace analysis and can be usefully employed for assistive purposes, but it can have a difficulty in analyzing a component that is hard to vaporize even by heating. For those reasons, the XPS is preferably used as the carbon analyzing method herein, but that method is not only the only possible one useable.

The XPS analysis will be summarized below. There are many binding states of carbon. In some compounds, several binding states are mixed with each other and are hard to be separated from each other. However, the following components can be relatively easily separated and estimated.

A first example of those components corresponds to a region where binding energy is 284.5 eV or below. That region includes the C—C bond of graphite and the C-M and C—H bonds of carbide. Among them, only the C—H bond does not contribute to electrical conductivity. It is difficult to separate the C—H component from the other two electro-conductive components. However, the inventors have discovered that when the components with binding energy of 284.5 eV or below are present at a ratio of a certain value or above, the characteristics of the spacer are adversely affected. This can be regarded as suggesting that the electro-conductive components of graphite and carbide adversely affect the characteristics of the spacer. Based on such a concept, in the present invention, a proportion (upper limit) of the components with binding energy of 284.5 eV or below is first defined to ensure insulation of the carbon film.

On the other hand, a region where binding energy is 287.0 eV or above corresponds to bonds of oxygen and carbon, such as C—O and C═O. This region appears when oxygen or some other element having a strong electron withdrawing property is bound to C. This region suggests the presence of a functional group at a carbon end. When this region appears at a higher proportion, it suggests that the carbon film does not have order at a relatively high degree and contains many end regions, e.g., a crystal end and a molecular end.

It is generally thought that the above-described carbon not having order at a relatively high degree is hard to graphitize by heating, irradiation of an electron beam or ions, etc.

Further, in a region where binding energy is from 286.0 eV to 287.0 eV, an sp3 component appears in many cases. A carbon component containing the sp3 component at a higher ratio suggests, though indirectly, the presence of microcrystalline carbon having order at a certain degree. Such a carbon component does not contribute in itself to electrical conductivity, but it is not surely advantageous to the spacer characteristics from the viewpoint of crystallinity described above.

The reason is that the carbon component having crystallinity is comparatively more apt to change into electro-conductive graphite.

Thus, the inventors have introduced the concept to define the carbon film in the present invention by defining respective presence proportions of the above-described three regions.

Usually, the above-described bond components are separated using XPS by performing waveform separation of an obtained spectrum through mathematical processing and by specifying respective components based on the separated waveforms. However, such a method has the following problem. The result of the waveform separation contains an arbitrary property depending on parameters given in the process of the waveform separation. For example, even when several kinds of components each having certain binding energy are assumed, the obtained result is arbitrarily changed depending on setting of a FWHM (Full Width at Half Maximum) of each component and a proportion of an approximate waveform component (proportion of Lorenzian/Gaussian).

Although those setting parameters can be defined as one solution, the present invention employs the following definition instead of such a solution.

More specifically, in a carbon spectrum resulting from subtracting a background, the definition is made based on respective integral areas of the above-described regions without performing the peak separation.

For a low-resistance carbon component, for example, the region of 284.5 eV or below is totally integrated and is used in a ratio calculation. A theoretical peak of graphite appears near 284.5 eV. With the above definition, therefore, about half the amount of graphite is not taken into account in the calculation, while C—H and so on other than graphite are taken into account in the calculation. However, such a point does not cause a significant problem. The reason is that the proportion of the region of 284.5 eV or below is increased as the content of graphite increases, and there is a close correlation between the integral area of that region and the desired characteristics of the spacer in the present invention.

The above description is similarly applied to the region of 287.0 eV or above. In this region, peaks of the bonds of C (carbon) and O (oxygen) appear. When an integral area of this region is calculated, there is a possibility that the amount of the C—O bond is partly not taken into account in the calculation. Conversely, other components are taken into account in the calculation. However, such a point does not cause a significant problem. In any event, the carbon component in the region of 287.0 eV or above represents the presence of an end group. Therefore, the region of 287.0 eV or above is also suitable to make the definition because of a close correlation between the integral area of that region and the desired characteristics of the spacer in the present invention.

Further, the above description is similarly applied to the region of 286.0 eV-287.0 eV. In other words, although assumed components are not always all reflected, there is a substantial correlation between the integral area of that region and the desired characteristics of the spacer practically used in the present invention.

Care has to be paid to a case where halogen elements, such as F, I, Cl and Br, are present near a terminal end of carbon. Even in such a case, the characteristics of the spacer are not basically adversely affected because of the presence of terminal end groups. However, if the halogen elements detach in the image display apparatus, the detached halogen elements possibly attack other members and cause an adverse influence due to an etching effect. For that reason, the halogen elements are desirably not present on the spacer surface. If an amount of the halogen elements is 5% or less with respect to the amount of carbon present on the spacer surface, components of the image display apparatus, including the electron-emitting device, are not adversely affected.

Figure 8A:
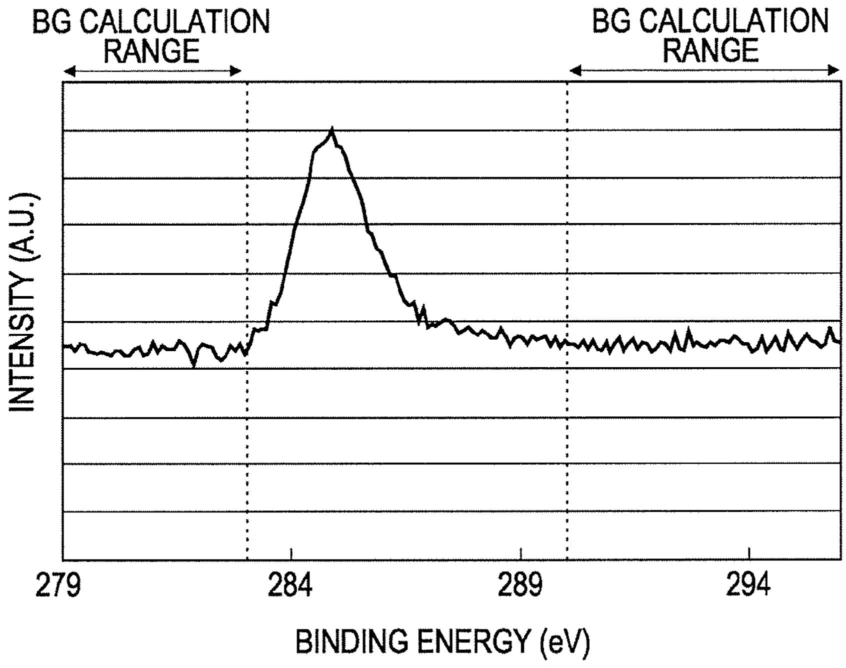
FIGS. 8A and 8B are graphs each plotting the result of an XPS composition analysis for the spacer used in the present invention.
Figure 8B:
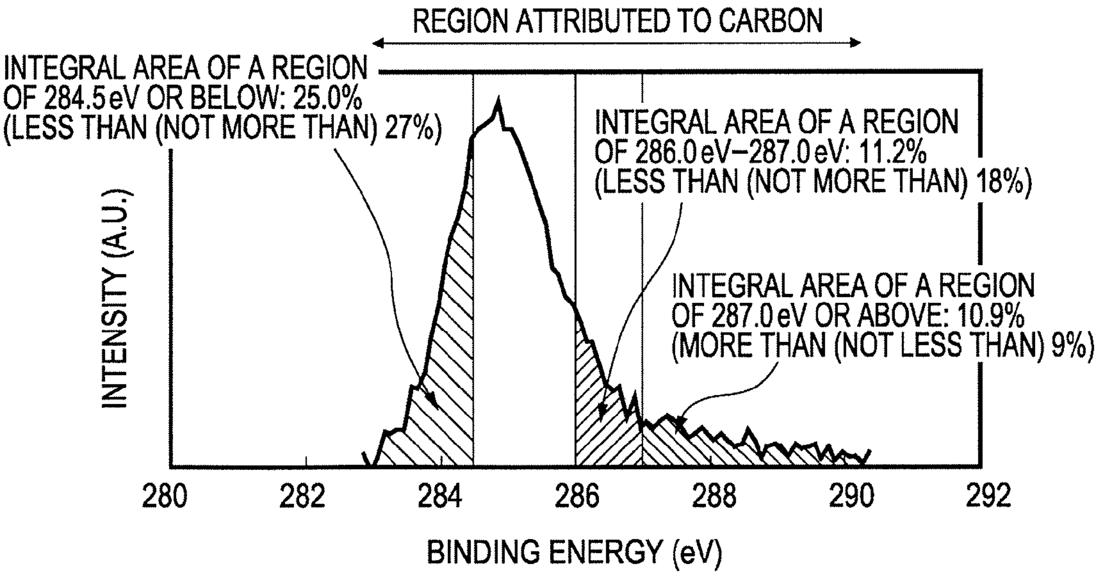

Because a background (BG) calculation method increases and decreases a resultant value to some extent, it is also defined herein. The background is assumed to be calculated by the so-called Shirley method. A definition range of the background is set as follows. A point having a minimum detection count in the range of 283 eV to 279 eV is set as one end on the lower energy side, and a point having a minimum detection count in the range of 290 eV to 296 eV is set as the other end on the higher energy side. In the present invention, the background is defined by connecting those two points based on the Shirley method, and the component obtained from subtracting the background from the analyzed result is defined as being attributed to carbon (i.e., a region attributed to carbon in a spectrum). FIGS. 8A and 8B are graphs each plotting the result of analyzing the surface composition of the spacer having the carbon film, according to the present invention, by the X-ray photoelectron spectroscopy (XPS). More specifically, FIG. 8A plots the analysis result before subtracting the background (BG), and FIG. 8B plots the analysis result after subtracting the background (BG). In the plotted example, the integral area of the region of 284.5 eV or below is 25%, the integral area of the region of 286.0 eV-287.0 eV is 11.2%, and the integral area of the region of 287.0 eV or above is 10.9%.

Further, in the present invention, because a very small amount of carbon is measured, due care has to be also paid to handling of a sample. Basically, when the sample is stored and conveyed, it is put in a degreased quartz case and/or wrapped with an aluminum foil. If such a basic requirement is satisfied, the measurement can be performed in the ordinary atmosphere without needing a specific atmosphere unless the former is extremely contaminated by organic materials.

In the XPS measurement, a space including the sample is sufficiently evacuated and the measurement is performed in a vacuum at a high level. This means that sample contaminants which are usually present in the atmosphere are removed through the evacuation. The amount of the contaminants remaining after the evacuation is so small as to not adversely affect the measurement result.

Nevertheless, a time during which the sample is exposed to the atmosphere should be kept as short as possible. From that point of view, the sample should, if possible, be stored and conveyed in a nitrogen atmosphere or a vacuum atmosphere.

The amount of carbon present on the surface is also measured by the XPS.

The XPS detects the amount of carbon present in a region (depth) of 10 nm or less from the surface. An element ratio detected by the XPS measurement is directly defined as representing the amounts (atomic %) of elements in the present invention. It is to be noted, however, that since hydrogen is not detected by the XPS, the amounts of elements are specified based on a total of other elements than hydrogen.

In addition, the amounts of elements are affected by a detection depth as well. In the measurement, therefore, a removal angle of a detector relative to the sample is defined to 75 degrees (incident angle=15°) in accordance with the standard practice. An X-ray for the measurement is provided by a monochromated AlKα-ray that is most commonly used in the ordinary XPS.

The inventors have confirmed that the carbon range effective in suppressing a beam position shift, according to an object of the present invention, can be determined based on the above-described method for measuring the carbon amount. The effective carbon comporision is provided when the following conditions (1), (2) and (3) are satisfied at the same time.

(1) The integral area of the region of 284.5 eV or below is 27% or less of an integral area attributed to carbon when the binding state of carbon is analyzed by the X-ray photoelectron spectroscopy.

If the integral area of the region of the above condition (1) exceeds 27% of an integral area attributed to carbon despite the following two conditions (2) and (3) being satisfied, a change of the beam position on the lower gradation side is increased to a level not suitable for practical use when the image display apparatus is driven for a long time. More specifically, the irradiation position of the electron beam after the driving in excess of 1000 hours is changed by 1% or more of the device pitch relative to the irradiation position of the electron beam in the initial driving state, and formation of a high-quality image is adversely affected.

(2) The integral area of the region of 286.0 eV-287.0 eV is 18% or less of an integral area attributed to carbon when the binding state of carbon is analyzed by the X-ray photoelectron spectroscopy.

If the integral area of the region of the above condition (2) exceeds 18% of an integral area attributed to carbon despite the other two conditions (1) and (3) being satisfied, a change of the beam position on the lower gradation side is increased to a level not suitable for practical use, similarly to the above-mentioned case (1), when the image display apparatus is driven for a long time. More specifically, the irradiation position of the electron beam after the driving in excess of 1000 hours is changed by 1% or more of the device pitch relative to the irradiation position of the electron beam in the initial driving state, and formation of a high-quality image is adversely affected.

(3) The integral area of the region of 287.0 eV or above is 9% or more of the total area when the binding state of carbon is analyzed by the X-ray photoelectron spectroscopy.

If the integral area of the region of the above condition (3) is smaller than 9% of an integral area attributed to carbon despite the other two conditions (1) and (2) being satisfied, a change of the beam position on the lower gradation side is increased to a level not suitable for practical use when the image display apparatus is driven for a long time. More specifically, the irradiation position of the electron beam after the driving in excess of 1000 hours is changed by 1% or more of the device pitch relative to the irradiation position of the electron beam in the initial driving state, and formation of a high-quality image is adversely affected.

Stated conversely, when a carbon compound satisfying all of the above conditions (1), (2) and (3) is present on the spacer, a change of the beam position on the lower gradation side after the driving for a long time does not increase by 1% or more of the device pitch relative to the irradiation position of the electron beam in the initial driving state, and formation of a high-quality image can be continued for a long time.

The above-mentioned beam shift amount indicated by 1% of the device pitch is attributable to a limit in sensing at which irregularities of an image can be discerned by human eyes. More specifically, the limit in sensing was determined based on the following sensory test.

Ten persons having an eyesight of 1.2 or higher and having no dyschromatopsia (abnormal color sense) were selected as test subjects. On a screen, the device pitch in a direction perpendicular to the spacer (i.e., the Y-direction in FIG. 1) was set to 700 μm. A visual distance was set to 1.7 m, i.e., an average visual distance of a display in general homes.

Figure 7:
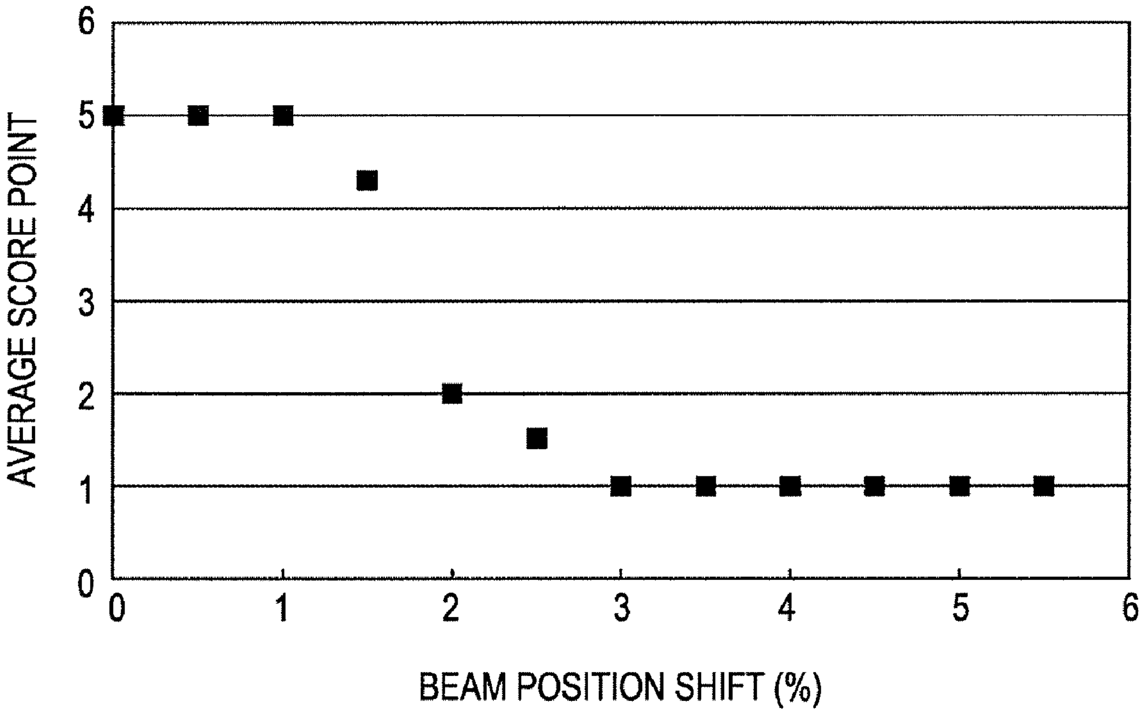
FIG. 7 is a graph illustrating the result of a sensory test, which represents the relationship between a beam shift and irregularities of an image in the vicinity of the space.

Under those conditions, each test subject was requested to provide any of the following score points depending on how the test subject perceived when the beam position was shifted from the normal position:

1 point: the position shift was very obstructive
2 points: the position shift was obstructive
3 points: the position shift was felt awkward, but not obstructive
4 points: the position shift was recognizable, but did not feel awkward
5 points: the position shift was not recognized at all As a result of averaging the score points provided by the ten test subjects, the relationship plotted in FIG. 7 was confirmed.

More specifically, the sensory test proves that, when the beam position shift in the direction perpendicular to the spacer exceeds 1% of the device pitch, some person starts to perceive irregularities of an image. Then, as the beam position shift increases from 1%, the number of persons feeling irregularities of an image is abruptly increased. For that reason, an allowable amount of the beam position shift is deemed to be 1% or less of the device pitch in the direction perpendicular to the spacer.

Such a requirement is satisfied by the spacer in which carbon deposited on the spacer surface meets the above-described conditions (1), (2) and (3). The spacer according to the present invention will be described in more detail below in connection with examples.

EXAMPLES

Example 1

A practical example of a method of manufacturing display panel, which represents the image display apparatus according to the present invention, will be described with reference to FIGS. 1 and 2.

(Rear Plate Process)

<Step 1: Formation of Wirings and Electrodes, See FIG. 2>

After sputtering a $SiO_2$ layer of 0.5 μm on the surface of a washed soda-lime glass (rear plate) 2006, a device electrode 2001 of each surface-conduction electron-emitting device is formed through a sputtering film formation process and a photolithographic process. Ti and Ni are stacked as materials of the device electrode 2001. An interval between two adjacent device electrodes 2001 is set to 2 μm (see FIG. 2A).

Then, column direction wirings 2002 are formed by printing an Ag paste in a predetermined shape and by firing the Ag paste. The column direction wirings 2002 are extended to a position outside a region where an electron source is to be formed, the extended portions serving as wirings to drive the electron source (see FIG. 2B).

Then, insulating layers 2003 are formed through a printing process, similarly to the above-described step, by using a paste which contains PbO as a main component and is mixed with a glass binder. The insulating layers 2003 serve to insulate the column direction wirings 2002 and row direction wirings 2004 (described later) from each other. Cutouts (not shown) are formed in the insulating layers 2003 at positions above the device electrodes 2001 for connection between the row direction wirings 2004 and the device electrodes 2001 (see FIG. 2C).

Figure 2A:
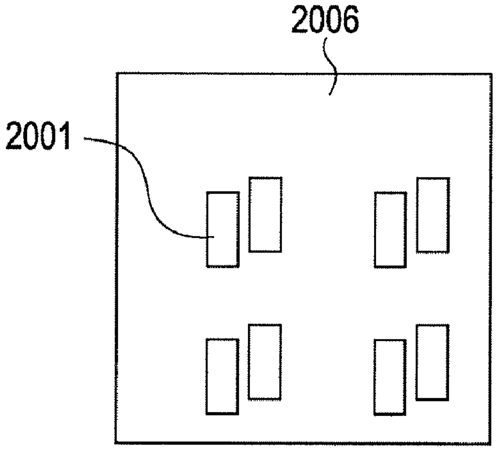
FIGS. 2A-2E illustrate successive steps of fabricating a rear plate used in the image display apparatus according to the present invention.
Figure 2B:
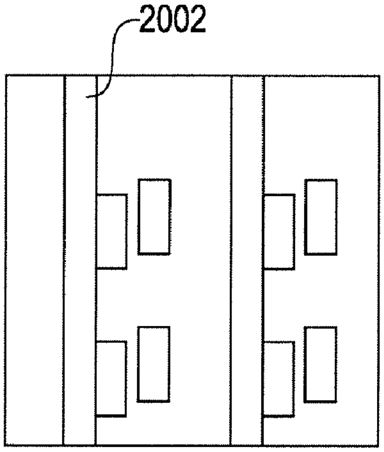
Figure 2C:
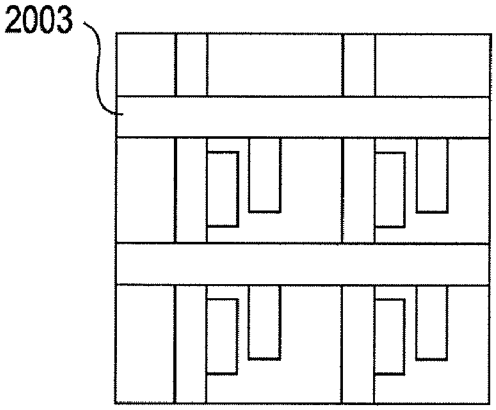
Figure 2D:
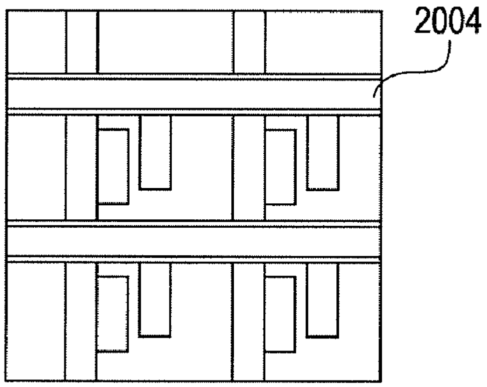
Figure 2E:
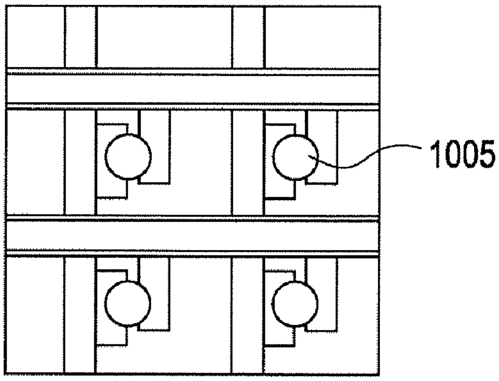

Then, the row direction wirings 2004 are formed on the insulating layers 2003 (see FIG. 2D). A method of forming the row direction wirings 2004 is the same as that of forming the column direction wirings 2002.

<Step 2: Fabrication of Electron Beam Source>

Subsequent to the above-described step, electro-conductive films 1005 made of PdO are formed. A method of forming the electro-conductive films 1005 includes the steps of forming a Cr film by sputtering on the substrate (rear plate) 2006 on which the row and column direction wirings 2004, 2002 have already been formed, and forming, in the Cr film, openings corresponding to respective shapes of the electro-conductive films 1005 by photolithography. Thereafter, a solution of an organic Pd complex compound is coated and fired at 300° C. in the atmosphere to form a PdO film. The Cr film is removed by wet etching, thus forming the electro-conductive films 1005 in the predetermined shapes by lift-off (see FIG. 2E).

Returning to FIG. 1, a number (N×M) of field emission type electron-emitting devices 101 are formed on the rear plate 106 (N and M are 2 or larger positive integers and are selected as appropriate depending on the number of target display pixels). In this example, N=2400 and M=800 are set. The rear plate 106 corresponds to the rear plate 2006 in FIGS. 2A-2E.

Because the image display apparatus of this example has a large size, it requires the atmospheric pressure-resistant support structure (spacer) 111. The spacer 111 is disposed on a row direction wiring 102 to maintain the interval between the rear plate 106 and the face plate 108. In this example, the height of the spacer 111 is set to 2 mm. A method of fabricating the spacer 111 will be described later.

The rear plate 106 is placed in an apparatus (not shown) capable of being evacuated to a vacuum state. A forming process is performed on the rear plate 106 when the pressure in the vacuum apparatus reaches $10^{-4}$ Pa or below. The forming process is performed by applying a pulse voltage, which has a gradually increasing height (amplitude) value, to each of the row direction wirings. A resistance value of the electron-emitting device is simultaneously measured by measuring a current value of the pulse applied for the forming process. When the resistance value per device exceeds 1 MΩ, the forming process for the relevant row is brought to an end for transition to the forming process for the next row. By repeating the above-described step for each row, the forming process for all the rows is completed.

Next, an activating process is performed. Prior to the start of the activating process, the pressure in the vacuum apparatus is further reduced to $10^{-5}$ Pa or below. Acetone is then introduced to the vacuum apparatus. An amount of introduced acetone is adjusted such that the pressure is held at $1.3\times10^{-2}$ Pa. Thereafter, a pulse voltage is applied to the row direction wiring. The pulse application is successively repeated for the row direction wirings by changing the row direction wiring, to which the pulse is applied, from one to another adjacent row per pulse. As a result of the activating process, a deposit film containing carbon as a main component is formed near an electron-emitting portion of each electron-emitting device, whereby a device current If and an emission current Ie are increased. In such a manner, the electron beam source 101 of the image display apparatus is fabricated.

(Face Plate Process)

<Step 1: Formation of Anode Electrode>

The anode electrode 110 is formed on a washed glass substrate. The anode electrode 110 is obtained by forming ITO, which is a transparent electro-conductive film, by sputtering.

<Step 2: Formation of Phosphor Film>

Figure 3A:
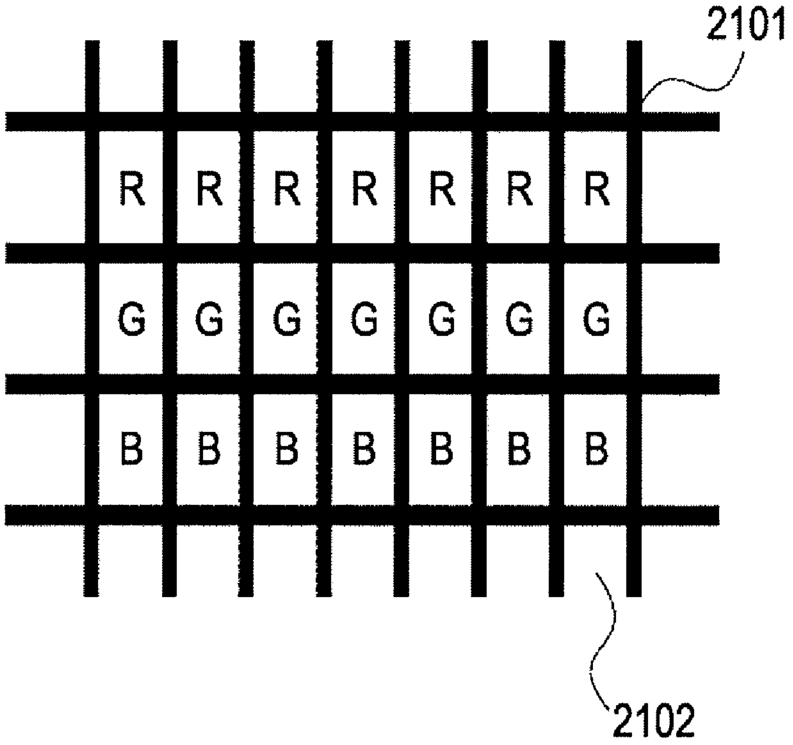
FIGS. 3A and 3B illustrate the structure of a face plate used in the image display apparatus according to the present invention.
Figure 3B:
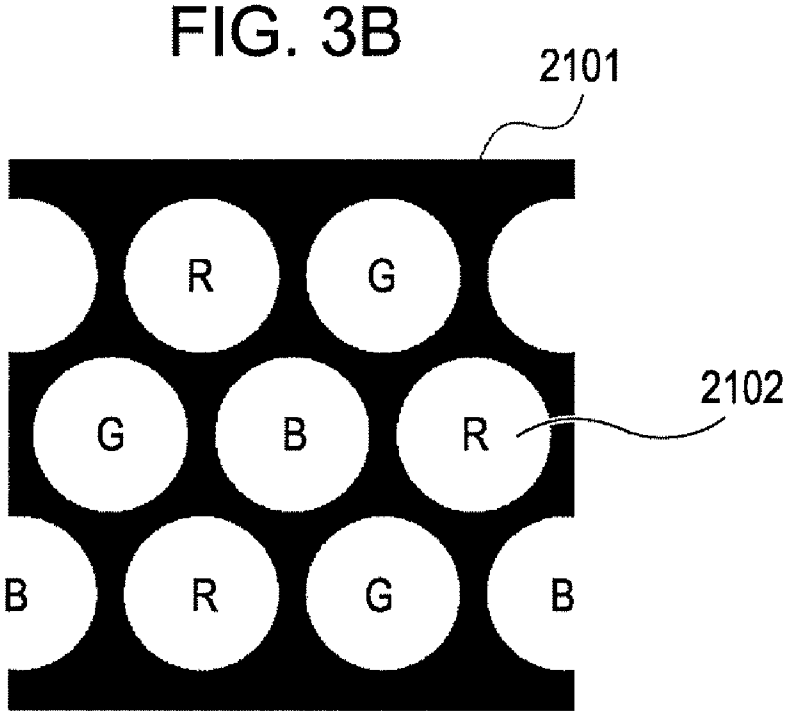

This step is described with reference to FIGS. 3A and 3B. A black matrix 2101 in the form of a matrix pattern, shown in FIG. 3A, is formed in thickness of 10 μm by screen printing using a paste that contains a glass paste, a black pigment and silver particles. The role of the black matrix 2101 is, for example, to prevent color mixing of the phosphors, to avoid color misregistration even with a slight shift of the electron beam, and to absorb extraneous light for an improvement of image contrast. While the black matrix 2101 is formed by screen printing in this example, the forming method is of course not limited to the screen printing and the black matrix 2101 can also be formed by, e.g., photolithography. Also, while the paste containing a glass paste, a black pigment and silver particles is used as a material of the black matrix 2101 in this example, the material of the black matrix 2101 is of course not limited to such a paste, and carbon black can also be used as another example. Further, while the black matrix 2101 in this example is formed in a matrix pattern as shown in FIG. 3A, the form of the black matrix 2101 is of course not limited to the matrix pattern. In other embodiments, it can be a delta array shown in FIG. 3B, a striped array (not shown), or some other suitable array.

Then, as shown in FIG. 3A, phosphors (image-forming members) 2102 in three colors are formed in openings of the black matrix 2101 with three cycles of screen printing each per color by using phosphor pastes of red, blue and green. While the phosphor film 2102 is formed by screen printing in this example, the forming method is of course not limited to the screen printing and the phosphor film 2102 can also be formed by, e.g., photolithography. The phosphors are provided by P22 phosphors which are used in the field of CRT; namely red (P22-RE3; Y2O2S: Eu3+), blue (p22-B2; ZnS: Ag, Al), and green (P22-GN4; ZnS: Cu, Al). Of course, the phosphors are not limited to those examples, and other suitable phosphors are also usable.

(Spacer Fabrication Process and Analysis)

Figure 4A:
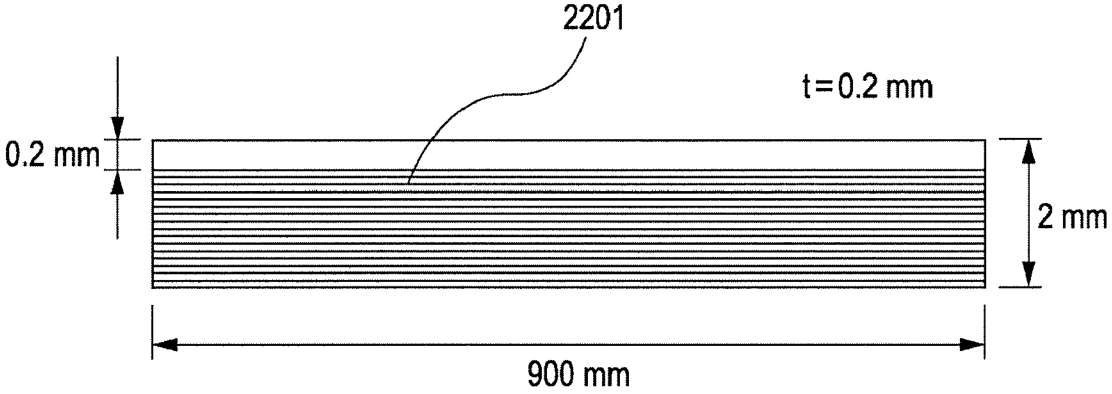
FIGS. 4A and 4B illustrate the shape of a spacer used in Examples of the present invention.
Figure 4B:
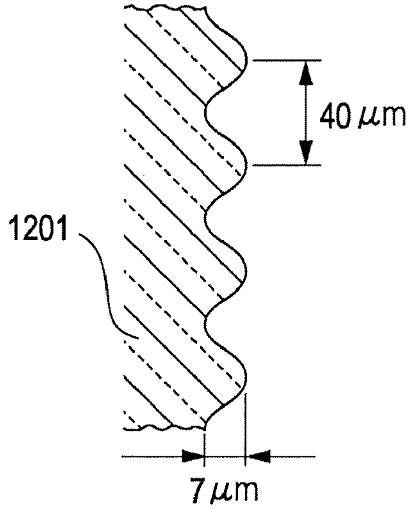

A low-alkali glass for a display, PD200 made by Nippon Sheet Glass Co., Ltd. can be used as a material of the spacer. By using such a material, a spacer base (1201 and 2201), shown in FIGS. 4A and 4B, is fabricated by a heating elongation method. FIG. 4A is a plan view of the spacer and FIG. 4B is a partial sectional view of the spacer. As shown in FIG. 4A, the spacer base having a length of 900 mm, a height of 2 mm, and a thickness of 0.2 mm (these sizes corresponding to the X-, Z- and Y-directions in FIG. 1) is formed in this example.

In this example, undulations are formed on the spacer surface in the form of stripes in the lengthwise direction of the spacer. As illustrated in FIG. 4B, the undulations have a substantially sine-wave form with a pitch of 40 μm and a depth of 7 μm. Further, the spacer has, in its upper portion (on the side joined to the face plate), a region where the undulations are not formed. That region has a width of 200 μm from the upper end of the spacer.

Then, an antistatic film is formed on the spacer base. The antistatic film is made up of nitride films of tungsten and germanium, and it is formed on the spacer base by sputtering while a gas mixture of nitrogen and argon is used as sputtering gas. Resistance adjustment is performed by changing a content ratio of tungsten to germanium.

The antistatic film is made of two layers. A first layer is set to a film thickness of 200 nm and sheet resistance of 2E12 Ω/□, and a second layer is set to a film thickness of 900 nm and sheet resistance of 2.5E13 Ω/□.

Figure 5:
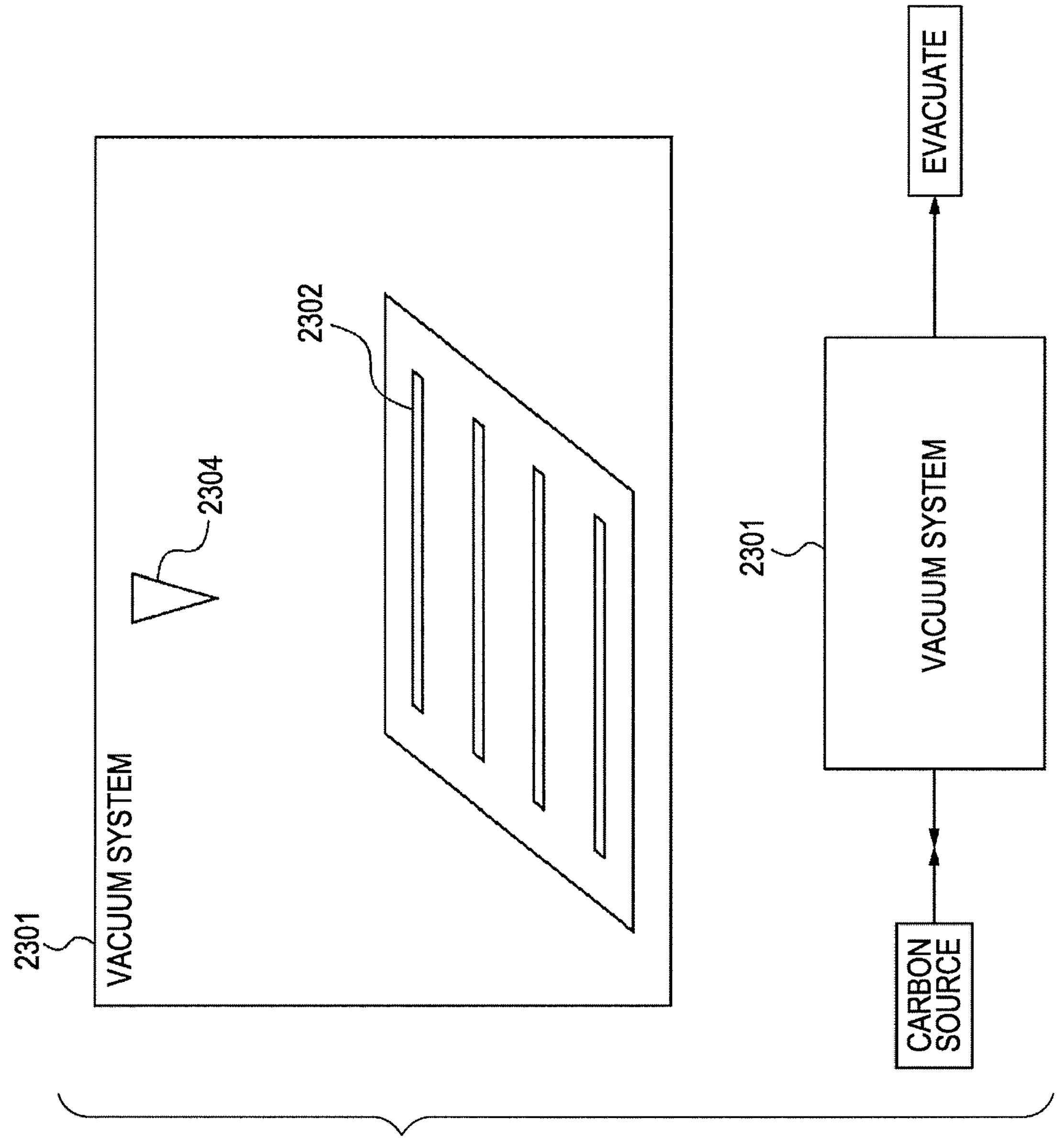
FIG. 5 illustrates an electron beam irradiation apparatus used in Example 1 of the present invention.

Then, a third layer, i.e., a carbon film representing the feature of the present invention, is formed on the above-mentioned second layer of the antistatic film. The carbon film is formed as described below with reference to FIG. 5. An electron gun 2304 capable of scanning an electron beam over a certain range is disposed in an airtight vacuum vessel (vacuum system) 2301 such that the electron beam can be uniformly irradiated over a designated range. The electron gun 2304 can be disposed plural to shorten a tact time.

A carbon source is stored in a separate ampule tube such that a trace amount of carbon is introduced to the vacuum system when a leak valve is opened.

A spacer 2302 is placed in the vacuum system such that the spacer is entirely uniformly irradiated by electrons. Thus, with the irradiation of electrons to the spacer 2302, a carbon film is deposited on the spacer surface due to charging of the spacer surface and the presence of a trace amount of carbon component in the atmosphere within the vacuum system.

While the carbon film deposited on the surface of the spacer 2302 partly desorbs with the repeated irradiation of electrons, some part remains there without desorbing and the other part is fixated there through polymerization induced by an electron beam. Therefore, the carbon film is gradually deposited on the surface of the spacer 2302. In other words, the fixated carbon is not always the same as the carbon source, and the gradually deposited carbon includes various forms that have the structures changed with the irradiation of the electron beam and are obtained through polymerization.

Figure 6:
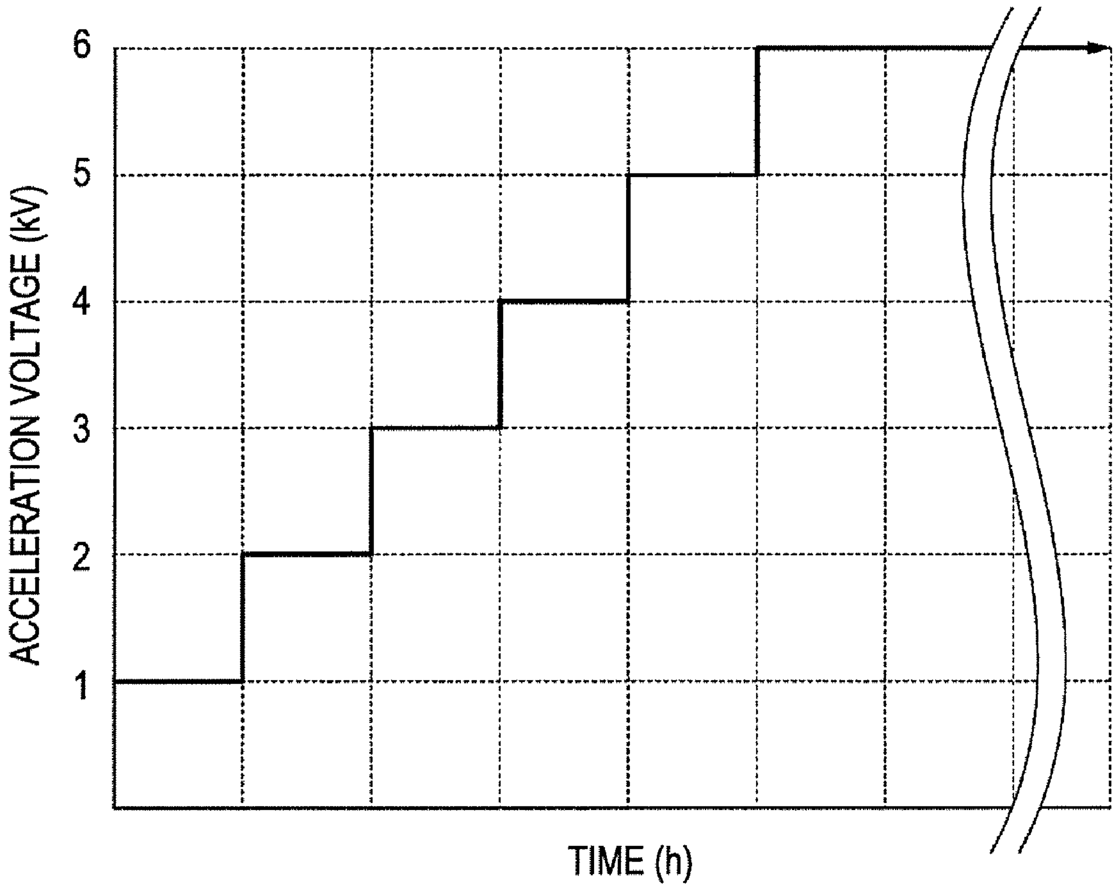
FIG. 6 is a graph illustrating a manner of increasing an acceleration voltage Va applied when an electron beam is irradiated in the image display apparatus used in Example 1 of the present invention.

In this example, glycerin is used as the carbon source. In a practical process of the electron irradiation, an electron acceleration voltage is gradually increased from 1 kV and finally up to 6 kV, following which it is kept at such a level for 20 hours. An electron emission amount is set to 20 μA and a beam diameter is set to 150 μm. FIG. 6 plots an electron irradiation profile (relationship between the acceleration voltage and time). The electron irradiation is performed on front and rear surfaces of the spacer 2302 to deposit the carbon film on each of both surfaces.

While the carbon film is deposited by the above-described method in this example, the method for depositing the carbon film is not limited to the above-described one. For example, the tact time can be shortened by changing the type of the carbon source and/or the conditions of the beam irradiation.

The spacer is completed through the above-described fabricating process.

(Integrating (Bonding and Sealing-Off) Step)

<Bonding and Sealing-Off Step>

The bonding and sealing-off step will be described with reference to FIG. 1. When assembling the airtight container, the airtight container should be sealed-off in such a manner as to ensure a sufficient level of strength and air-tightness at each joined portion between the components. In this example, the frame member 107 and the rear plate 106, shown in FIG. 1, are bonded to each other by coating frit glass over the joined portion and by firing the coated frit glass in a nitrogen atmosphere at 400-500° C. for 10 minutes or longer.

Then, the spacer fabricated in the above-described process is fixed to the rear plate. More specifically, the spacer 111 is fixed to the rear plate 106 by using the fixing members 112 which are attached to lengthwise opposite ends of the spacer 111 on the side close to the rear plate 106. The fixed opposite ends of the spacer 111 are positioned outside the image area and cause no effects on image quality. While the spacer 111 is fixed to the rear plate 106 in this example, the fixing manner is of course not limited to the illustrated one. For example, the spacer can be fixed to the face plate 108. Alternatively, a self-standing spacer can be just disposed without fixing it.

Thereafter, a metal having a low melting point, i.e., In, is coated over the frame member, and the face plate (FP) 108 is bonded to the frame member by locally heating only a joined portion between them in an inert atmosphere. The bonding and sealing-off of the airtight container is thus completed.

To evacuate the interior of the airtight container to a vacuum state, after assembling the airtight container, an evacuation tube and a vacuum pump (both not shown) are connected to the airtight container. The interior of the airtight container is evacuated to a vacuum level of about $10^{-5}$ Pa. The evacuation tube is then sealed off. Additionally, to maintain the vacuum level in the airtight container, a getter film (not shown) is formed at a predetermined position within the airtight container immediately before the sealing-off or after the sealing-off. The term "getter film" means a film that is formed through vapor deposition by heating a getter material containing, e.g., Ba as a main component with a heater or high-frequency heating. With the adsorptive action of the getter film, the interior of the airtight container is maintained at a vacuum level of $1\times10^{-3}$ Pa to $1\times10^{-5}$ Pa.

The image display apparatus according to the present invention is thus fabricated.

For image evaluation, the fabricated image display apparatus was continuously driven by applying the electron acceleration voltage of 10 kV and displaying an image. In the image display apparatus of this example, even after the driving for 1000 hours, the shift amount of the electron beam in a direction perpendicular to the lengthwise direction of the spacer was 1% or less of the device pitch, and a high-quality image was obtained.

Thereafter, the airtight container (panel) of the image display apparatus was disassembled and carbon present on the spacer surface was analyzed by the XPS. Analysis conditions were as follows.

First, the panel was disassembled in an ordinary clean room. Then, the spacer was taken out from the panel and was quickly placed into a degreased quartz case after wrapping it with an aluminum foil.

Further, the spacer was set on a sample stand for the XPS analysis as soon as possible, and the sample stand including the spacer was put into a preliminary evacuation chamber of a measurement apparatus.

Quantera made by ULVAC-PHI INC. was used as the measurement apparatus. Measurement conditions were as follows:

Spot size; 100 μm

Detector; take-off angle 75°

Pass energy; 140 eV

Step size; 0.125 eV

Number of measurements; 30

The analysis result showed that, in a spectrum induced from carbon present on the spacer surface, the integral area of the region with binding energy of 284.5 eV or below was 10.2% of the total area, the integral area of the region with binding energy of 287.0 eV or above was 25.6% of the total area, and the integral area of the region with binding energy of 286.0 eV-287.0 eV was 13.8% of the total area.

Further, a proportion of carbon in all the elements was 22% when the measurement was performed under the above-described conditions (hydrogen was not included because it could not be measured). Halogen elements were not detected.

Example 2

In EXAMPLE 2, the spacer was fabricated by a method of depositing the carbon film after assembling the panel (airtight container). First, as in EXAMPLE 1, the spacer including two layers of nitride films of tungsten and germanium was prepared, and the panel was fabricated by using the spacer, the rear plate, the face plate, and the frame member.

By applying the electron acceleration voltage Va to the anode electrode of the panel and applying a voltage between scanning drawings (row direction wirings) and signal wirings (column direction wirings), electron emission was generated to display an image.

Conditions were set so as to generate the electron emission at 5 μA on the average per electron-emitting device. Also, Vf (voltage applied between the scanning wirings and signal wirings) was set to about 18 V.

Further, all lines were driven with the same waveform (10 μsec). During the above process, the image display apparatus was placed stationary in a thermostatic chamber and the chamber temperature was set to 50° C.

The voltage Va applied to the anode electrode was gradually increased from 2 kV. At that time, whenever the voltage was increased by an increment of 1 kV, it was kept at each increased level for 15 minutes and was finally increased up to 10 kV, following which such a state was held for 5 hours.

Thereafter, Va and Vf were turned off, thus completing the image display apparatus. Image evaluation of the completed image display apparatus was performed in the same manner as in EXAMPLE 1.

Also in the image display apparatus of this example, even after the driving for 1000 hours, the shift amount of the electron beam in the direction perpendicular to the lengthwise direction of the spacer was 1% or less of the device pitch, and a high-quality image was obtained.

After the image evaluation, the image display apparatus was disassembled and the analysis of the spacer surface was performed in the same manner as in EXAMPLE 1. The analysis result showed that, in a spectrum induced from carbon present on the spacer surface, the integral area of the region with binding energy of 284.5 eV or below was 10.8% of the total area, the integral area of the region with binding energy of 287.0 eV or above was 26.3% of the total area, and the integral area of the region with binding energy of 286.0 eV-287.0 eV was 14.1% of the total area.

Further, a proportion of carbon in all the elements was 26.5% when the measurement was performed under the above-described conditions. Halogen elements were not detected.

Example 3

In EXAMPLE 3, an image display apparatus was assembled without performing special treatment on the spacer in advance as in EXAMPLE 2.

Then, the assembled image display apparatus was driven by applying voltages Va and Vf as in EXAMPLE 2.

The driving of the image display apparatus was performed in a thermostatic chamber as in EXAMPLE 2. During the driving, the ambient temperature was set to 50° C. Additionally, an IR lamp was illuminated toward the image display apparatus from above to effectively increase the temperature of the spacer inside the thermostatic chamber.

As in EXAMPLE 2, the applied voltage Va was gradually increased from 2 kV. At that time, whenever the voltage was increased by an increment of 1 kV, it was kept at the increased level for 15 minutes and was finally increased up to 10 kV, following which such a state was held for 5 hours.

Thereafter, Va and Vf were turned off, thus completing the image display apparatus. Image evaluation of the completed image display apparatus was performed in the same manner as in EXAMPLE 2.

As a result of the image evaluation, even after the driving for 1000 hours, the shift amount of the electron beam in the direction perpendicular to the lengthwise direction of the spacer was 1% or less of the device pitch, and a high-quality image was obtained.

After the image evaluation, the image display apparatus was disassembled and the analysis of the spacer surface was performed in the same manner as in EXAMPLE 1. The analysis result showed that, in a spectrum induced from carbon present on the spacer surface, the integral area of the region with binding energy of 284.5 eV or below was 8.6% of the total area, the integral area of the region with binding energy of 287.0 eV or above was 27.8% of the total area, and the integral area of the region with binding energy of 286.0 eV-287.0 eV was 13.1% of the total area.

Further, a proportion of carbon in all the elements was 25.6% when the measurement was performed under the above-described conditions. Halogen elements were not detected.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-139372 filed May 25, 2007 and No. 2008-113900 filed Apr. 24, 2008, which are hereby incorporated by reference herein in their entirety.

What is claimed is:

1. An image display apparatus including:

a rear plate having electron-emitting devices thereon;

a face plate having associated image-forming members configured to emit light upon being irradiated by electrons emitted from the electron-emitting devices; and at least one spacer positioned between the rear plate and the face plate, wherein the spacer has a carbon film on a surface thereof and the carbon film has oxygen-carbon bonds and has characteristics such that, in a spectrum obtained by X-ray photoelectron spectroscopy, an integral area of a region of 284.5 eV or below is 27% or less of an integral area attributed to carbon, an integral area of a region of 286.0 eV-287.0 eV is 18% or less thereof, and an integral area of a region of 287.0 eV or above is 9% or more thereof.

2. The image display apparatus according to claim 1, wherein the carbon film contains halogen elements represented by I, Cl, F and Br, and an atomic % of the halogen elements is 5% or less.

3. An image display apparatus including:

a rear plate having electron-emitting devices thereon;

a face plate having associated image-forming members configured to emit light upon being irradiated by electrons emitted from the electron-emitting devices; and at least one spacer positioned between the rear plate and the face plate, wherein the spacer has a carbon film on a surface thereof and the carbon film has sp2 bonds, sp3 bonds and oxygen-carbon bonds and has characteristics such that, in a spectrum obtained by X-ray photoelectron spectroscopy, an integral area of a region of 284.5 eV or below is 27% or less of an integral area attributed to carbon, an integral area of a region of 286.0 eV-287.0 eV is 18% or less thereof, and an integral area of a region of 287.0 eV or above is 9% or more thereof.

* * * * *